United States Patent
Kumar et al.

Patent Number: 5,754,538
Date of Patent: May 19, 1998

[54] SYSTEM FOR TRANSMITTING LEARNING INFORMATION VIA A TIME-VARYING TRANSMISSION CHANNEL AND CORRESPONDING TRANSMISSION AND RECEIVING EQUIPMENT

[75] Inventors: Vinod Kumar, Paris; Christophe Mourot, Asnieres, both of France

[73] Assignee: Alcatel N.V., Rijswijk

[21] Appl. No.: 518,710

[22] Filed: Aug. 24, 1995

[30] Foreign Application Priority Data

Aug. 31, 1994 [FR] France ............... 94 10503

[51] Int. Cl.<sup>6</sup> ............... H04B 7/212; H04J 3/04
[52] U.S. Cl. ............... 370/347; 364/517; 370/498; 370/503; 370/535; 375/230; 375/231; 375/232
[58] Field of Search .................. 370/498, 503, 370/336, 345, 347, 342, 468, 476, 479, 252, 535; 364/517; 375/346, 231, 232, 226, 227, 288, 233, 358, 229, 230; 371/5.5, 47.1

[56] References Cited

U.S. PATENT DOCUMENTS

| | | | |
|---|---|---|---|
| 4,792,940 | 12/1988 | Hiraguchi | 375/231 |
| 5,127,051 | 6/1992 | Chan et al. | 380/49 |
| 5,185,764 | 2/1993 | Baier | 375/231 |
| 5,323,422 | 6/1994 | Ushirokawa | 375/232 |
| 5,537,438 | 7/1996 | Mourot et al. | 370/347 |
| 5,559,723 | 9/1996 | Mourot et al. | 364/517 |
| 5,566,172 | 10/1996 | Mourot | 370/347 |

FOREIGN PATENT DOCUMENTS

| | | |
|---|---|---|
| 0415897A1 | 3/1991 | European Pat. Off. . |
| 0428199A2 | 5/1991 | European Pat. Off. . |
| WO9117607 | 11/1991 | WIPO . |

*Primary Examiner*—Wellington Chin
*Assistant Examiner*—Melissa Kay Carman
*Attorney, Agent, or Firm*—Sughrue, Mion, Zinn, Macpeak & Seas, PLLC

[57] ABSTRACT

In a system for transmitting information via a time-varying transmission channel, learning information is transmitted in addition to wanted information to enable the transmission channel to be estimated at the receiving end. The system estimates if it is necessary to transmit learning information given the current variations of the transmission channel and transmits learning information only if this is deemed necessary.

16 Claims, 3 Drawing Sheets

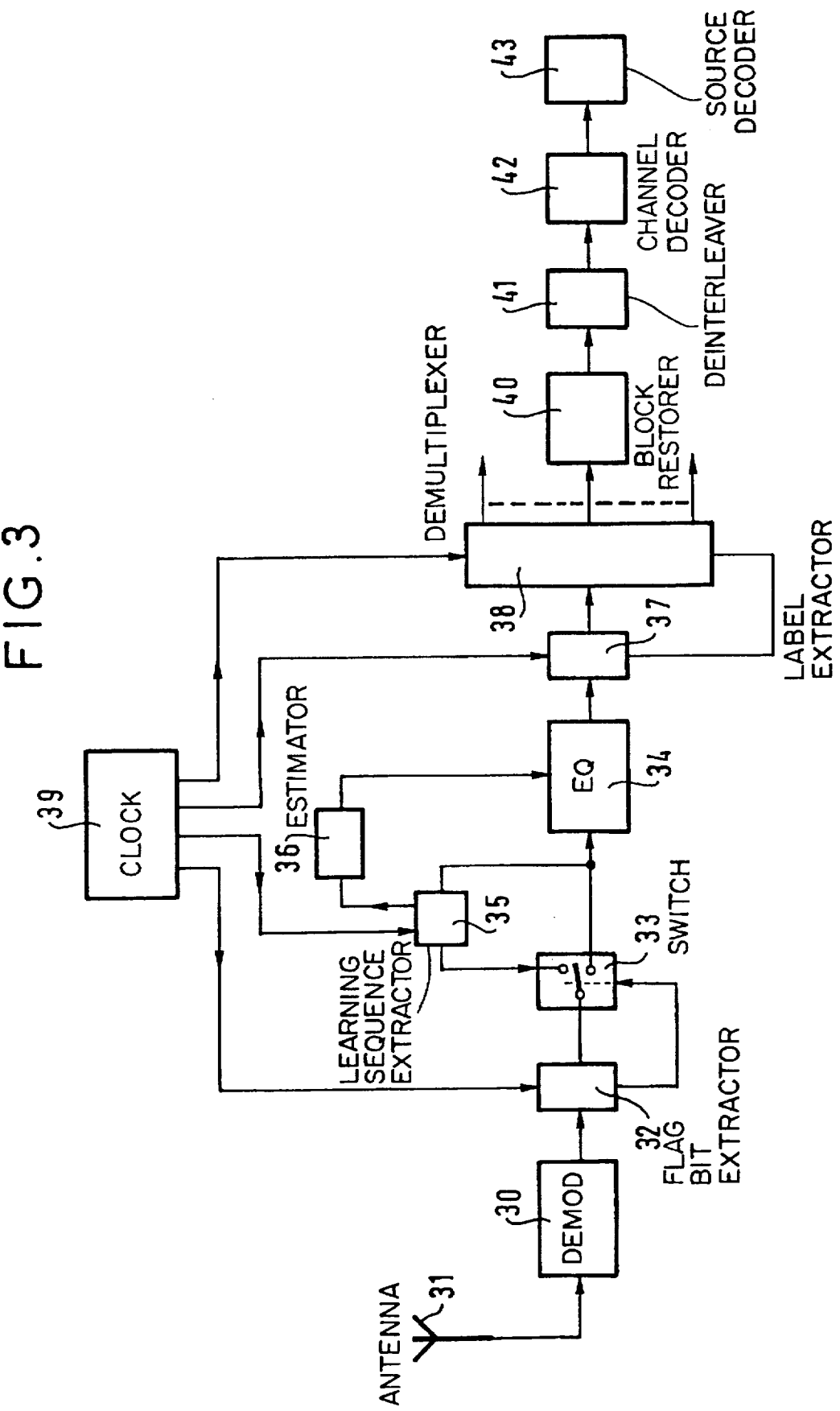

SYSTEM FOR TRANSMITTING LEARNING INFORMATION VIA A TIME-VARYING TRANSMISSION CHANNEL AND CORRESPONDING TRANSMISSION AND RECEIVING EQUIPMENT

BACKGROUND OF THE INVENTION

1. Field of the Invention

The present invention is generally concerned with transmitting information and in particular transmitting information via a time-varying transmission channel such as a radio transmission channel, for example, with particular reference to a mobile radio system.

2. Description of the Prior Art

A known method of combating the distortion introduced by a transmission channel is to estimate the transmission channel (i.e. to estimate the distortion it introduces) at the receiving end and to correct the received signals accordingly, before extracting the information from them, to minimize the distortion affecting the signals. In the case of digital transmission in particular, one known method is to estimate the time spread introduced by the transmission channel at the receiving end and to correct the received digital signals accordingly, by equalizing them, so that they are as close as possible to signals with no intersymbol interference.

Another known method of estimating a transmission channel is to transmit so-called learning information alongside the wanted information to be transmitted; unlike the wanted information, the learning information is known to the receiver in advance so that the estimate can be arrived at by comparing the information expected and the corresponding information received.

In the case of a time-varying transmission channel, unlike a cable transmission channel, for example, it is not sufficient to carry out estimation once and for all at the start of transmission; to the contrary, estimation is also required during transmission.

In a time division multiple access digital mobile radio system such as the GSM system (Global System for Mobile communications), for example, each burst placed in a time slot of a time-division multiplex structure characteristic of the system contains a learning sequence in addition to the wanted information.

The nature of the wanted information to be transmitted by a system such as the GSM system, namely traffic (speech or data) and signalling, and the type of signalling to be transmitted in the latter case, define a so-called logical channel and said time-division multiplex structure includes, in addition to a frame structure defining how the physical transmission channels (or time slots of the frame structure) are time-division multiplexed, multiframe and hyperframe structures defining how the physical transmission channels are time-shared between the various logical channels.

Thus in the GSM system the burst used to transmit wanted information relating to a logical channel other than the dedicated signalling channels (frequency correction channel: FCCH, synchronization channel: SCH and random access channel: RACH) includes 26 learning sequence bits plus 114 wanted information bits.

One drawback of this is that a non-negligible part of the transmission resources is used to transmit information other than the wanted information.

One object of the present invention is to alleviate this drawback and thereby to obtain an enhanced efficiency of transmission channel use and in particular, all other things being equal, an increase in the payload that can be transmitted by the transmission system in question, or a reduction in the transmission time achieved by the system, or a reduction in interference between users of the system.

SUMMARY OF THE INVENTION

Accordingly, the present invention consists in a system for transmitting information via a time-varying transmission channel of the type in which learning information is transmitted in addition to wanted information enabling said transmission channel to be estimated at the receiving end, characterized in that it includes means for estimating if it is necessary to transmit learning information given the current variations of said transmission channel and means for transmitting learning information only if this is deemed necessary.

Other objects and features of the present invention will emerge from a reading of the following description of embodiments given with reference to the appended drawings.

BRIEF DESCRIPTION OF THE DRAWINGS

FIGS. 2 and 3 respectively show examples of transmit equipment and receive equipment in a transmission system in accordance with the invention in an application to a mobile radio system of the GSM type.

DETAILED DESCRIPTION OF THE INVENTION

Figure 1:
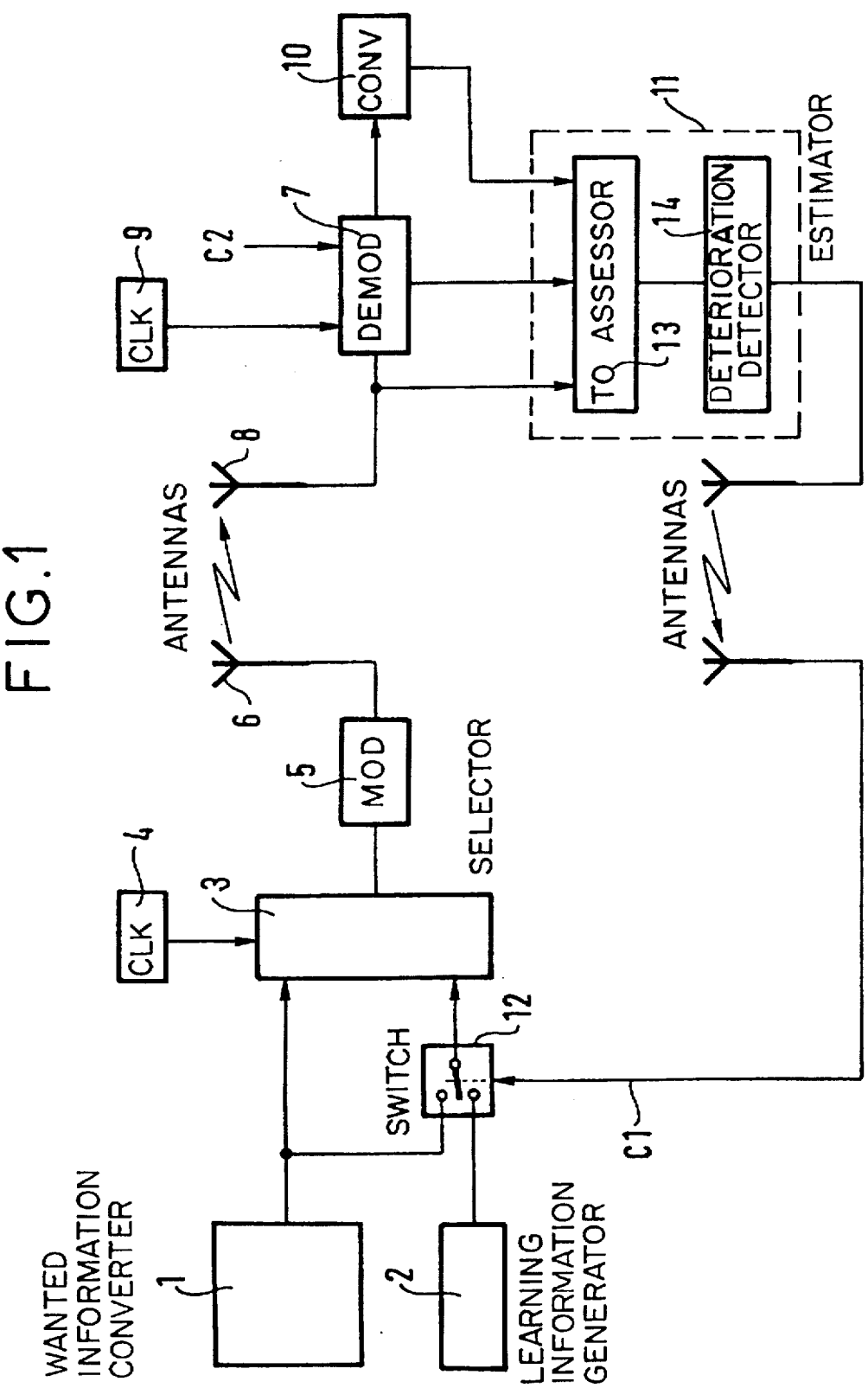
FIG. 1 is a block schematic of one example of the transmission system in accordance with the invention.

The transmit equipment of the transmission system shown in FIG. 1 includes, in a manner that is known in itself:

- means 1 for converting the wanted information to be transmitted by the system into a form suitable for transmission by the system, the means 1 possibly including, in the aforementioned application to a mobile radio system such as the GSM system, source coding means, channel coding means and means for formatting the coded information in a format compatible with the aforementioned time-division multiplex structure,
- a learning information generator 2,
- means 3 for selecting either the wanted information from the means 1 or the learning information from the generator 2, under the control of a clock 4, in accordance with said time-division multiplex structure in the aforementioned application example,
- a modulator 5 connected to a transmit antenna 6 and receiving the information from the means 3.

The receive equipment of the transmission system shown in FIG. 1 includes, also in a manner that is known in itself:

- demodulator means 7 connected to a receive antenna 8 and including means, not specifically illustrated, for estimating the transmission channel (symbolically represented in this example by a radio transmission channel) from received learning information and for correcting the received signals corresponding to the wanted information in accordance with this estimate, the means 7 operating under the control of a clock 9 in accordance with said time-division multiplex structure in the aforementioned application example,
- means 10 receiving the information from the demodulator means 7 and executing a function that is the converse of that carried out in the transmit equipment by the means 1.

In accordance with the invention, this system further includes:

- means 11 for estimating if it is necessary to transmit learning information given the current degree of variation in the transmission channel,
- means 12 for transmitting learning information only when this is deemed to be necessary.

The means 11 include, in the example shown in FIG. 1:

- means 13 for assessing the quality of transmission by the system,
- means 14 for detecting any deterioration in the quality of transmission as assessed in this way, and
- means 12 for transmitting learning information only if transmission quality has deteriorated.

In the embodiment shown the means 12 also transmit wanted information in place of learning information if transmission of the latter is not deemed to be necessary, i.e. in this example if transmission quality has not deteriorated.

To this end the means 12 are symbolically represented in FIG. 1 by a switch receiving the wanted information from the means 1 and the learning information from the generator 2, this switch being controlled by a signal C1 which in this example comes from the means 14 for detecting transmission quality deterioration and is routed from the receive equipment to the transmit equipment via a return channel. The return channel is also symbolically represented as a radio channel and could use the other transmission direction of a bidirectional transmission system, for example.

In the example shown in which wanted information can be transmitted in place of learning information, the demodulator means 7 also operate under the control of a control signal C2 indicating whether or not wanted information is substituted for learning information, the signal C2 being obtained from dedicated information introduced at the transmitting end, for example. Other examples of generation of the signal C2 are given later.

The assessment of transmission quality referred to above can be carried out in various ways already known in themselves, for example:

- evaluation of the signal to noise ratio or the signal to interference ratio,
- evaluation of the bit error rate,
- examination of the estimated characteristics of the transmission channel,
- examination of quality indicators supplied by the demodulator means if the latter supply, for each received digital information symbol, in addition to the value determined for that symbol a demodulation quality indicator, or confidence indicator, associated with that value (this is sometimes called a "soft-decision"),
- examination of the behavior of the tracking algorithm of the equalizer in the case of demodulator means including an equalizer with a tracking device: if the error signal that normally causes the algorithm to converge becomes too great, this indicates that the transmission channel has deteriorated,
- a combination of these techniques.

FIG. 1 shows the various possibilities in that the information needed for the means 13 to carry out said assessment can be the signals applied to the demodulator means 7 or information from the demodulator means 7 or information from the means 10.

If no learning information is transmitted, the bit error rate can be evaluated from the wanted information if the means 1 implement channel coding using one or more techniques to protect against transmission errors.

For evaluation of the bit error rate, it would be equally possible to transmit information other than wanted information known in advance to the receive equipment in some of the space left available by the absence of learning information. Such information could additionally be used to synchronize the receive equipment to the transmit equipment.

In another embodiment, assessing whether or not learning information needs to be transmitted could depend on a prior study of propagation conditions in the transmission channel in question. The means for estimating if such transmission is necessary or not could then include means for determining if a particular time has elapsed or not since the last transmission of learning information, for example, this time being determined during the prior study just mentioned.

One example of application of the present invention to a GSM type mobile radio system is described next with reference to FIGS. 2 and 3 which respectively show a transmit equipment and a receive equipment.

Figure 2:
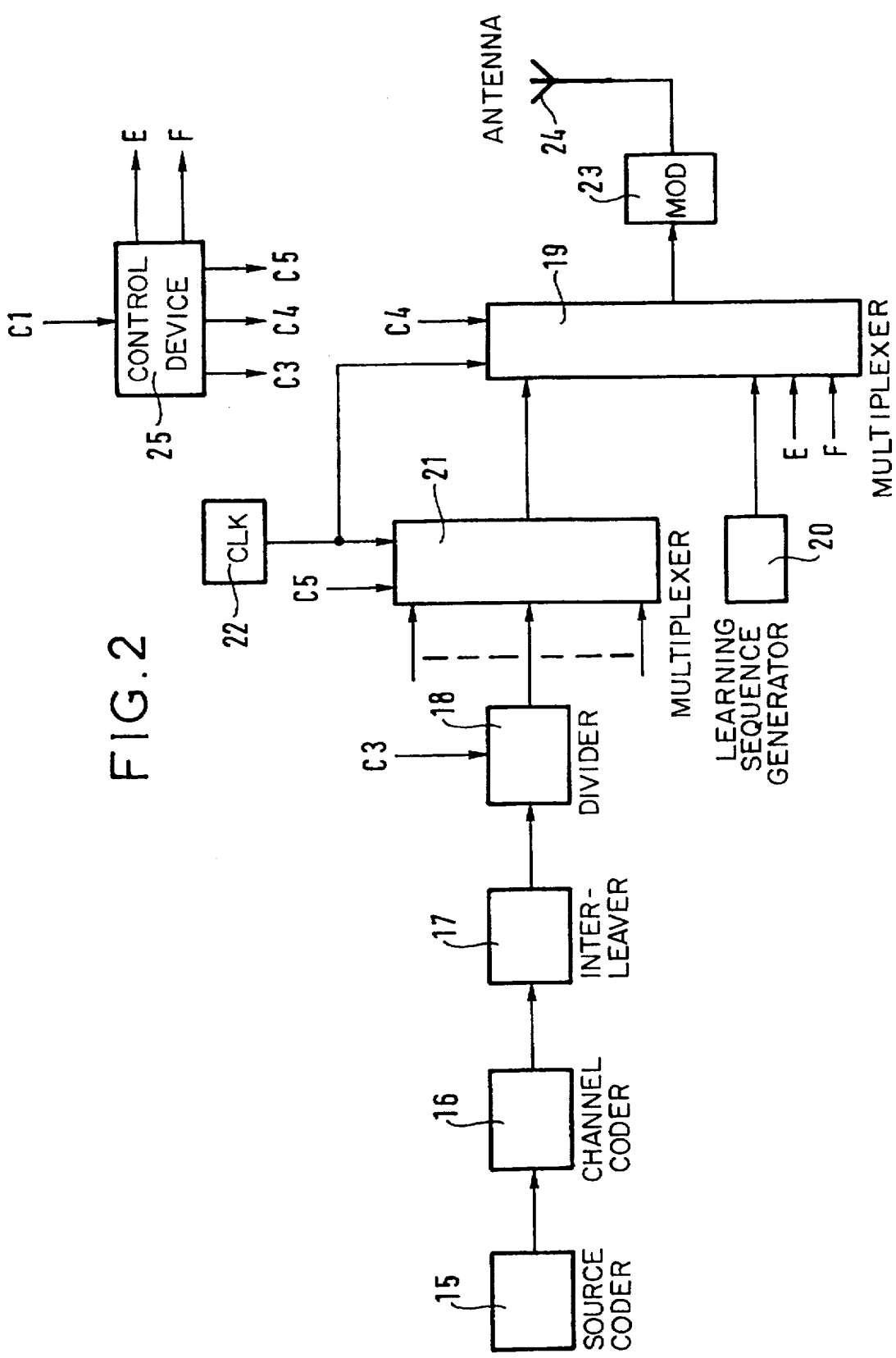

The transmit equipment shown in FIG. 2 includes means for converting the wanted information relating to each type of logical channel to be transmitted by the transmit equipment into a form suitable for transmission by the system. For simplicity only the means for converting wanted information relating to one of the logical channels are shown, the others being similar and the dedicated signalling channels FCCH, SCH and RACH not being relevant in this context, as previously mentioned.

These means include, in a manner that is known in itself:

- a source coder 15 delivering entities called symbol blocks,
- a channel coder 16 delivering symbol blocks coded to protect them against transmission errors,
- interleaving means 17 for interleaving the bits of the coded blocks obtained in this way in order to decorrelate said transmission errors,
- divider means 18 for dividing the blocks from the means 17 into sub-blocks to be divided between a plurality of successive bursts.

The sub-blocks from the divider means 18 and from like divider means of converter means for other logical channels are multiplexed by a multiplexer 19 with information other than wanted information, in particular with a learning sequence from a learning sequence generator 20, to constitute transmission entities called bursts, these bursts being placed in those of the physical transmission channels allocated to them by the system for a given call.

Selection of sub-blocks from the divider means 18 relating to one logical channel or sub-blocks from divider means relating to other logical channels is effected by another multiplexer 21, the two multiplexers 19 and 21 being controlled by a clock 22 in accordance with said time-division multiplex structure.

To transmit them on the transmission channel in question, the bursts from the multiplexer 19 are fed to a modulator 23 connected to a transmit antenna 24.

In the GSM system, a block relating to a channel other than the dedicated signalling channels FCCH, SCH and RACH include 456 bits after they are coded to protect them against transmission errors and a burst contains two groups of 57 wanted bits separated by a learning sequence of 26 bits. Depending on the type of logical channel, the 114 wanted bits of a burst are formed from one or more sub-blocks of one more successive blocks relating to that logical channel, the sub-blocks having a particular so-called nominal length for that logical channel.

In accordance with the invention, and in the example shown in FIGS. 2 and 3 in which space left free by the absence of the learning sequence is used to transmit wanted information, the length of the sub-blocks delivered by the divider means 18 varies. The divider means receive a control signal C3 from control means 25 in turn receiving the signal commanding presence or absence of the learning sequence. As in FIG. 1, this is the signal C1.

The wanted information transmitted in the space left free in a physical transmission by the absence of the learning sequence can relate to the same logical channel as that occupying the remainder of the physical channel or a different logical channel.

If this information relates to the same logical channel as that occupying the remainder of the physical channel, the length of the sub-blocks from the divider means 18 can be greater than said nominal length. In this case transmitting a complete block may require fewer bursts than when said sub-blocks always have said nominal length, and this represents a potential saving in transmission time.

When transmitting speech, however, any such gain in transmission time is of no benefit since the speech information has been reconstituted with a constant data rate.

In the case of data transmission, any such gain in transmission time can be of benefit (providing that the data does not need to be transmitted in circuit mode, in which case the above remark in respect of transmitting speech applies).

However, apart from the fact that it can be of benefit in itself, any such gain in transmission time always enables radio channel occupancy time to be reduced, which reduces the risk of interference with other users.

The space left free within a physical transmission channel by the absence of the learning sequence can also be used by a logical channel other than that occupying the remainder of the physical channel, so increasing the payload that can be transmitted by the system.

If the logical channel occupying the remainder of the physical channel is a traffic channel, for example, the other channel just referred to can be a signalling channel or another traffic channel. This other traffic channel can be allocated for the same call as the previous one or for a different call.

Consider, for example, two such calls involving two different mobile stations and the same base transceiver station in which the transmit equipment in question is housed and assume for the forward direction (from the base transceiver station to the mobile station), for example, that the mobile station involved in said other call has previously been advised of that call by the paging channel PCH.

A choice between the various possible uses of the space left free by the absence of the learning sequence is made by the control circuit 25 in accordance with predefined criteria which depend on the application of the transmission system in question and therefore cannot all be described here. In addition to a signal C3 for the divider means 18, the control circuit 25 produces control signals C4 and C5 for the multiplexer 19 and the multiplexer 21, respectively.

To enable the receive equipment that receives the bursts produced in this way by the multiplexer 19 to determine whether a receive burst contains a learning sequence or not, the multiplexer 19 can additionally insert at the start of the burst a flag bit F dedicated to this indication, its value being determined by the control circuit 25, for example.

If the learning sequence is automatically transmitted again after a particular time-delay, this indication may not be needed.

In the situation mentioned above of transmitting information other than wanted information known in advance to the receive equipment in part of the space left free by the absence of the learning sequence, the indication of the presence or the absence of a learning sequence could further result from correlation in the receive equipment between the information expected and the corresponding information received. The information other than wanted information transmitted in this way would then be such that the result of any such correlation would be clearly different according to whether the correlation was effected on the basis of that information or on the basis of information taken from the learning sequence.

If a burst received does not contain any learning sequence and wanted information is substituted for the learning sequence, to enable the receive equipment receiving the bursts produced in this way by the multiplexer 19 to determine the nature of the logical channel then occupying the space left free by the absence of the learning sequence, the multiplexer 19 can additionally insert at the start of that space a few bits constituting a label E dedicated to this indication, their value also being determined by the control circuit 25, for example.

The receive equipment shown in FIG. 3 corresponds, for example, to the case in which the flag F and the label E are introduced at the transmitting end and includes, at the output of a demodulator 30 connected to a receive antenna 31:

means 32 for extracting the flag bit F, a switch 33 controlled by the bit F to route the digital signals from the demodulator 30 and corresponding to the received information, less the flag bit F extracted by the means 32, to equalizer means 34, either directly if there is no learning sequence or via means 35 for extracting the learning sequence if the latter is present, means 36 for estimating the transmission channel, operating on the basis of the learning sequence extracted by the means 35, and supplying the estimation result to the equalizer means 34, means 37 for extracting from the information from the equalizer means 34 the label bits E indicating to what type of logical channel the wanted information substituted for the learning sequence relates, demultiplexer means 38 for dividing the information from the means 37 between a set of processor channels each corresponding to one of the logical channels that can be received by the receive equipment (other than the channels FCCH, SCH and RACH which are not relevant in this context, as mentioned above), only one of which is shown in detail for simplicity (the others are similar).

Each of the means 32, 35, 37 and 38 operates under the control of a clock 39 in accordance with said timedivision multiplex structure and operation of the demultiplexer means 38 is conditioned by the content of the label E.

Each of said processor channels relating to a given logical channel includes:

means 40 for reconstituting coded and interleaved blocks from coded and interleaved sub-blocks received with varying lengths and, on the output side of said means 40, conventional means executing functions that are the converse of those executed at the transmitting end, namely:

deinterleaving means 41, channel decoder means 42, source decoder means 43.

Unlike the conventional situation in which the reconstitution of coded blocks is from fixed length sub-blocks, the means 40 must further include a buffer memory (not explicitly shown in the drawings) for absorbing reduced data rates due in particular to the possible use of the space left free in a physical channel by the absence of the learning sequence to transmit therein wanted information relating to a logical channel other than that occupying the remainder of that physical channel, said reduced data rates being then those pertaining to said other logical channel.

If the wanted information has to be reconstituted at the receiving end with a constant data rate, the buffer memory also absorbs increased data rates due to possible use of the space left free in a physical transmission channel by the absence of the learning sequence to transmit wanted information relating to the same logical channel as that occupying the remainder of the physical channel, said increased data rates being those pertaining to that logical channel.

In the case of a speech channel, an increased data rate due to an addition of n bits (with n=26 in the application considered here, for example) could be absorbed by eliminating n meaningless bits within a block at the transmitting end, instead of using a receive buffer memory, these n bits being detected as such by means for detecting absence of speech activity, for example, and transmitting a small block. This small block could include an indicator to show how the n bits were eliminated, so that the source decoder could decode the small block correctly, using techniques that are known in themselves.

There is claimed:

1. System for transmitting information via a time-varying transmission channel, of the type in which learning information is transmitted in addition to wanted information enabling said transmission channel to be estimated at the receiving end, said system including means for estimating if it is necessary to transmit learning information given the current variations of said transmission channel and means for transmitting learning information only if this is deemed necessary.

2. System according to claim 1 wherein said means for estimating if it is necessary to transmit learning information given said current variations of said transmission channel include means for assessing transmission quality and means for detecting deterioration of said transmission quality thus assessed.

3. System according to claim 1 wherein said means for estimating if it is necessary to transmit learning information given said current variations of said transmission channel include means for determining if a defined time has elapsed since the last transmission of learning information.

4. System according to claim 1 further including a return channel for transmitting information indicating whether it is necessary or not to transmit learning information.

5. System according to claim 1 further including means for transmitting wanted information in place of learning information if transmission of the latter is not deemed to be necessary.

6. System according to claim 5 wherein said transmission system is a time-division multiplex system multiplexing a set of physical channels each of which can be time-shared between a plurality of logical channels, said learning information occupies only part of a physical channel, and said wanted information substituted for learning information in a physical channel relates to the same logical channel as that occupying the remainder of said physical channel.

7. System according to claim 5 wherein said transmission system is a time-division multiplex system multiplexing a set of physical channels each of which can be time-shared between a plurality of logical channels, said learning information occupies only part of a physical channel, and said wanted information substituted for learning information in a physical channel relates to a logical channel other than that occupying the remainder of said physical channel.

8. System according to claim 6 further including, at the transmitting end, means for dividing said wanted information to be transmitted into sections of varying length according to the presence or the absence of learning information and, in the absence of learning information, depending on the use of locations left free by the absence of learning information, and, at the receiving end, means for absorbing the resulting variations in data rate.

9. System according to claim 1 further including means at the transmitting end for introducing information indicating the presence or the absence of learning information.

10. System according to claim 6 further including, at the transmitting end, means for introducing information indicating the nature of the logical channel to which the wanted information substituted for learning information relates.

11. Receive equipment for a transmission system according to claim 1 including means for estimating if it is necessary to transmit learning information given said current variations of said transmission channel.

12. Receive equipment for a transmission system according to claim 8 including means for absorbing variations in data rate due to the fact that the received wanted information is divided into sections of varying length.

13. Receive equipment according to claim 12 for a transmission system applied to a GSM type mobile radio system wherein said sections constitute sub-blocks.

14. Transmit equipment for a transmission system according to claim 1 including means for transmitting learning information only if this is deemed to be necessary given said current variations of said transmission channel.

15. Transmit equipment for a transmission system according to claim 8 including means for dividing said wanted information to be transmitted into sections of varying length.

16. Transmit equipment according to claim 15 for a transmission system applied to a GSM type mobile radio system wherein said sections constitute sub-blocks.

* * * * *